US006694137B2

(12) United States Patent
Sharon

(10) Patent No.: US 6,694,137 B2
(45) Date of Patent: Feb. 17, 2004

(54) METHOD AND SYSTEM FOR PROVIDING BROADBAND MOBILE ACCESS FROM GEOSTATIONARY SATELLITES TO PLATFORMS USING SMALL, LOW PROFILE ANTENNAS

(75) Inventor: Thomas E. Sharon, Duluth, GA (US)

(73) Assignee: EtherWare, LLC, Duluth, GA (US)

( * ) Notice: Subject to any disclaimer, the term of this patent is extended or adjusted under 35 U.S.C. 154(b) by 0 days.

(21) Appl. No.: 10/426,258

(22) Filed: Apr. 29, 2003

(65) Prior Publication Data
US 2003/0203733 A1 Oct. 30, 2003

Related U.S. Application Data
(60) Provisional application No. 60/376,673, filed on Apr. 29, 2002.

(51) Int. Cl.[7] .......................... H04B 7/185; H04Q 7/20
(52) U.S. Cl. ................. 455/427; 455/12.1; 370/316
(58) Field of Search ........................ 455/427, 430, 455/12.1, 13.2, 560, 562.1, 561, 428, 429, 3.01, 3.02; 370/316, 318, 319, 320, 321

(56) References Cited

U.S. PATENT DOCUMENTS

| 5,485,464 | A | * | 1/1996 | Strodtbeck et al. | ......... 370/319 |
|---|---|---|---|---|---|
| 5,625,624 | A | * | 4/1997 | Rosen et al. | ................ 370/307 |
| 6,157,811 | A | * | 12/2000 | Dent | ........................ 455/12.1 |
| 6,216,250 | B1 | * | 4/2001 | Williams | .................... 714/799 |
| 6,249,514 | B1 | * | 6/2001 | Campanella | ................ 370/316 |
| 6,324,381 | B1 | * | 11/2001 | Anselmo et al. | ........... 455/12.1 |
| 6,512,749 | B1 | * | 1/2003 | Wright et al. | ................ 370/316 |
| 2002/0032003 | A1 | * | 3/2002 | Avitzour et al. | ........... 455/12.1 |
| 2003/0008614 | A1 | * | 1/2003 | Hanson et al. | ............. 455/12.1 |

* cited by examiner

*Primary Examiner*—Nay Maung
*Assistant Examiner*—Edan Orgad
(74) *Attorney, Agent, or Firm*—King & Spalding LLP

(57) ABSTRACT

A satellite-based communications system operating at high data rates in a broadcasting (multicasting) mode enables the use of mobile ground terminals with low profile antennas whose areas are significantly smaller than previous embodiments not using this invention. The invention can be applied to existing (in-orbit) or new satellites (including those in non-geostationary orbits) operating with linearly polarized downlink transponders. Important embodiments include the use of Ku FSS satellites providing service within the continental U.S. ("CONUS"), and the use of Ku BSS satellites operating within Europe. Transponder pairs on board the satellite with opposite linear polarization, but overlapping frequency bands, receive a specially processed uplink waveform from an uplink facility. Service may be optimized for (1) a particular geographical area by using receiving sensors located in that area, monitoring the polarization of the broadcast signal; or (2) a particular location with the satellite operating in a unicasting mode (delivery of Internet data or "local" video/audio broadcasts). A spread-spectrum waveform can also be used on the downlink, with the resultant processing gain applying directly to antenna area reduction and improved interference. Redundancy or increased capacity can be achieved by locating a second satellite in the same orbital location broadcasting the orthogonal circular polarization.

15 Claims, 11 Drawing Sheets

METHOD AND SYSTEM FOR PROVIDING BROADBAND MOBILE ACCESS FROM GEOSTATIONARY SATELLITES TO PLATFORMS USING SMALL, LOW PROFILE ANTENNAS

RELATED APPLICATION

This application claims priority under 35 U.S.C. 119 to U.S. Provisional Patent Application Serial No. 60/376,673, filed on Apr. 29, 2002. The complete disclosure of this referenced provisional patent application is fully incorporated herein by reference.

FIELD OF THE INVENTION

This invention relates to methods and systems for communicating high-speed data and streaming content (video and audio, both "live" and pre-recorded) to mobile users with small, low-profile antennas using satellite-based communication systems.

BACKGROUND OF THE INVENTION

The success of the worldwide direct broadcast satellite service (Ku BSS)—also called direct-to-home ("DTH")—has resulted in hundreds of video and audio channels being available to customers regardless of their location relative to high-speed terrestrial lines (DSL, cable). Customer acceptance has been good even in urban areas due in large measure to the very small (~45 cm) antenna reflector ("dish") required. The small antenna size minimizes wind loading and makes roof mounting feasible. This small antenna size results from the high ERP (~53 dBW) generated by the satellite payload, and the 9-degree satellite spacing in the Ku BSS bands imposed by regulatory agencies (such as the FCC). For US BSS service, the satellites radiate a circularly polarized wave simplifying the installation process. As long as the ground terminal antenna is properly "pointed" at the satellite, the antenna (or feed) can be rotated around the "pointing" axis without affecting performance. This is particularly desirable for moving platforms. The uplink signal is provided to each transponder independently, and merely "repeated" at an amplified level on the downlink. DTH satellites have also been used to provide high-speed data two-way data by coupling a "forward-link" using a receive-only satellite terminal to a separate "return-link" (such as a "dial-up" modem, cellular/PCS modem, or a lower-speed two way satellite).

Despite the desirable features of the DTH systems, there are only a very limited number of orbital slots available because of the 9-degree spacing. Over the continental US ("CONUS"), only three centrally located slots are available and all three slots are occupied, leaving no capacity for additional services.

Many of the desirable qualities of the broadcast DTH service also appear in the Ku FSS bands. The 2-degree spacing of the FSS satellites creates many more locations for satellite broadcast. One Canadian DTH service provider, for example, has used Ku FSS satellites for broadcast to the home with larger dishes due to the lower ERP of Ku FSS satellites (typically 47–50 dBW). A typical high-speed two-way Ku FSS terminal in the U.S. market has a reflector close to 1 m in diameter.

For a CONUS Ku FSS mobile service, there are additional complications in the ground terminal implementation compared to the reception of a circularly polarized DTH signal:

(1) Due to the variation of polarization with movement of the platform, a dual polarized ground antenna is required in all cases (even if only one transponder is being received), or the polarization must be "tracked" electronically or with an additional third-axis mechanical tracking loop.

(2) The much smaller beamwidth of the receive antenna compared to the DTH application (1.9 degrees for a 1 m antenna versus 3.5 degrees for a 45 cm antenna) makes tracking and alignment more critical. Since components like gyros are used to provide inertial pointing references, the improved accuracy; has a dramatic impact on component costs for the positioner. A 1 degree pointing error (representative of mechanical pointing accuracy which can be readily achieved with inexpensive positioners) induces a ~3 dB gain loss for the 1 m antenna, but only ~1 dB for the 45 cm antenna.

(3) The lower radiated power of Ku FSS satellite transponders (typically ERP in the 47–50 dBW range compared to the higher 53–56 dBW of the DTH satellites) requires the use of a larger ground terminal antenna (~2×diameter, or 6 dB higher gain) to ensures that the received signal strength is adequate.

Although there is significant interest in the use of communications satellites for mobile applications, there has been very limited deployment of such services based on Ku FSS satellites. Interest remains high for such communications services, as shown by the following issues in Table I:

(1) Satellites provide the only ubiquitous coverage of large areas such as the continental US ("CONUS") or Europe, and for broadcast applications they are extremely efficient from a cost viewpoint;

(2) For mobile applications, they remain the only current technology capable of providing high-speed data to a rapidly moving platform regardless of location;

(3) Since Ku FSS satellites do not generally use numerous narrow downlink spot beams, there is no complicated procedure at the control center for handing off between beams due to the motion of the user; and (4) Satellites continue to remain the only viable technology for providing broadcast and high-speed data over the oceans. The use of Ku FSS satellites for two-way, high-speed communications has historically required large, expensive tracking antennas for both pointing the beam and continuously adjusting the polarization due to movement.

In view of the foregoing, there is a significant need in the marketplace for a solution that combines the small size of the DTH antenna with the simpler tracking requirements associated with the reception of circular polarization.

SUMMARY OF THE INVENTION

The present invention provides a satellite-based communications system and method for supporting improved high speed data (including video streaming) communications to mobile terminal or units having small, low profile antennas suitable for operation on an aircraft fuselage or on the roof of land mobile platforms, such as SUV's and minivans. The method is typically compatible with geostationary satellites operating in the "FSS" frequency bands, as well as new satellites that may be launched in vacant slots in such bands. The inventive method is also applicable to future non-geostationary satellites operating with linearly polarized downlinks.

In connection with the inventive satellite-based communications system, uplink signals can be provided to dedicated paired transponders on geostationary satellites. The uplink signals can contain broadcast data and correction factors that maintain a high degree of purity in the quality of the circular polarization of the signal received on the ground. The data can be broadcast (multicast) video and audio content or Internet data including large files where high-speed downlink transfer is critical. The correction factors can be optimized for each type of content based on the known location of each mobile terminal, whose location coordinates have been previously transmitted to the uplink facility.

Control circuitry at the uplink facility can optimize each transponder for either broadcast (multicast) services over a wide geographical area, or optimize each transponder for Internet data delivery (one-to-one) or local video broadcasts intended for a mobile user in a particular location. This optimization can include the ability to adjust on a packet-by-packet basis the uplink waveform based on measurements performed at the uplink or remote sites.

A second satellite can be positioned in the same orbital position to provide redundancy or double the capacity by transmitting the orthogonal circular polarization. Additional system capacity can be added on a transponder-by-transponder basis, using transponders all contained within one satellite or by using a plurality of satellites in the network.

One aspect of the present invention results in a mobile antenna with <¼ the area of prior art (for a specific satellite transponder configuration), with ~½ the corresponding data throughput. A spread spectrum waveform can be added to the downlink waveform, resulting in further reduction in antenna size. In this manner, a mobile terminal can employ a much smaller antenna aperture (less than ¼ the area) than current systems, while allowing operation with one received polarization in the mobile antenna. For example, a low-cost phased array antenna can be used as a receiving antenna for a mobile unit or terminal. Mobile tracking antennas designed according to the teachings of the present invention can be implemented with electronic beam steering that contain less than ⅛ the number of required elements of prior art designs.

The above objects, features and advantages of the present invention are readily apparent from the following detailed descriptions of a number of exemplary embodiments of the present invention when taken into account with the accompanying drawings.

DETAILED DESCRIPTION OF THE EXEMPLARY EMBODIMENTS

Figure 1:
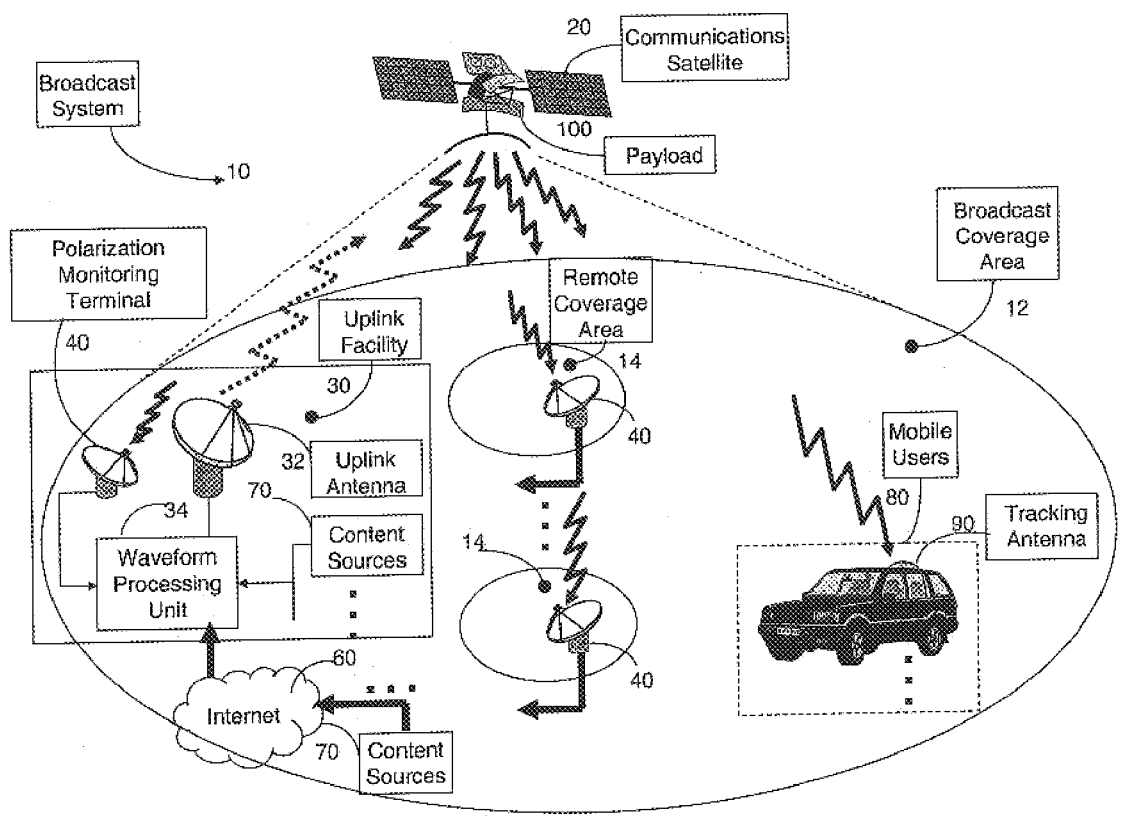
FIG. 1 is a diagrammatic representation illustrating an exemplary embodiment of a satellite communications system in a configuration suitable for delivering broadcast or multicast data to mobile users.

Referring to FIG. 1, an exemplary embodiment 10 of the invention (broadcast system 10) is illustrated utilizing a communications satellite 20 for providing high-speed broadcast or multicast (one-way) communications to mobile users 80 from content sources 70 at the uplink facility 30, or content sources 70 which are connected by the Internet 60 to the uplink facility. The system includes a communications satellite 20 with payload 100 containing dedicated transponder resources, an uplink facility 30 for providing a unique waveform to coupled transponders within each satellite, a plurality of mobile users 80 with tracking antennas 90, and polarization monitoring terminals 40 located at the uplink site (as well as remote coverage areas 14) for establishing the polarization quality of the downlink waveform. The monitoring terminals at the uplink facility establish the corrections which must be inserted by the waveform processing unit 34 into the radiated signals transmitted by the uplink antenna 32 to the pair of linearly polarized transponders on board the satellite for optimum operation within the broadcast area 12. Likewise, the remote monitoring terminals establish the optimum settings for these corrections for transmission of signals to remote areas for use in local channel broadcast or Internet data delivery. The correction data from the remote monitoring terminals are sent to the uplink facility over the Internet 60, or dedicated lines that are part of the PSTN.

Figure 2:
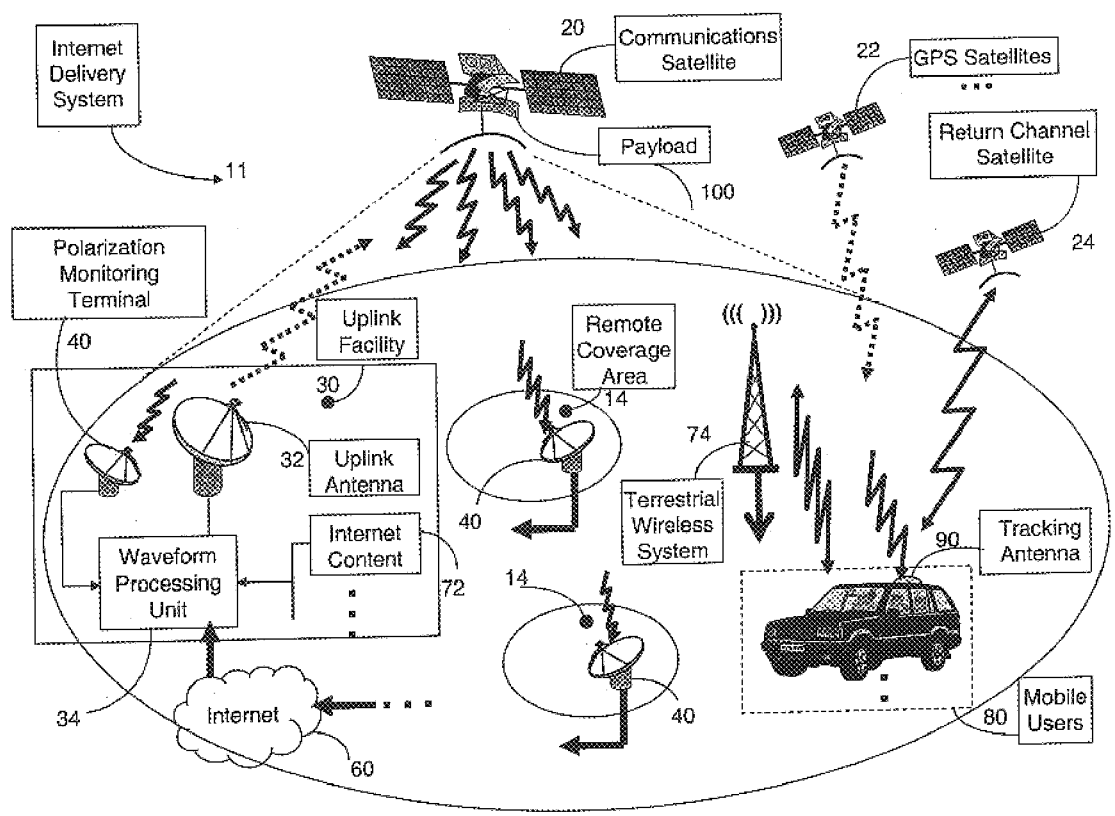
FIG. 2 is a diagrammatic representation illustrating an alternative exemplary embodiment of a satellite communications system in a configuration suitable for delivering two-way Internet data to mobile users.

In FIG. 2, an alternative exemplary embodiment of the invention (Internet Delivery System 11) is shown suitable for providing two-way Internet data to mobile users. Relative to FIG. 1, FIG. 2 illustrates the addition of a return channel signal from the mobile users 80 routed through either a terrestrial wireless system 74 or a return channel satellite 24. The return channel satellite may or may not be the same physical satellite as the communications satellite 20. Also shown are signals being received from Global-Positioning-Satellites 22 for establishing the locations of each mobile user. As a minimum, the return channel data will include periodic updating of the mobile user's location data, but in general will also include requests for Internet content 72 and acknowledgements associated with its successful reception.

Figure 3:
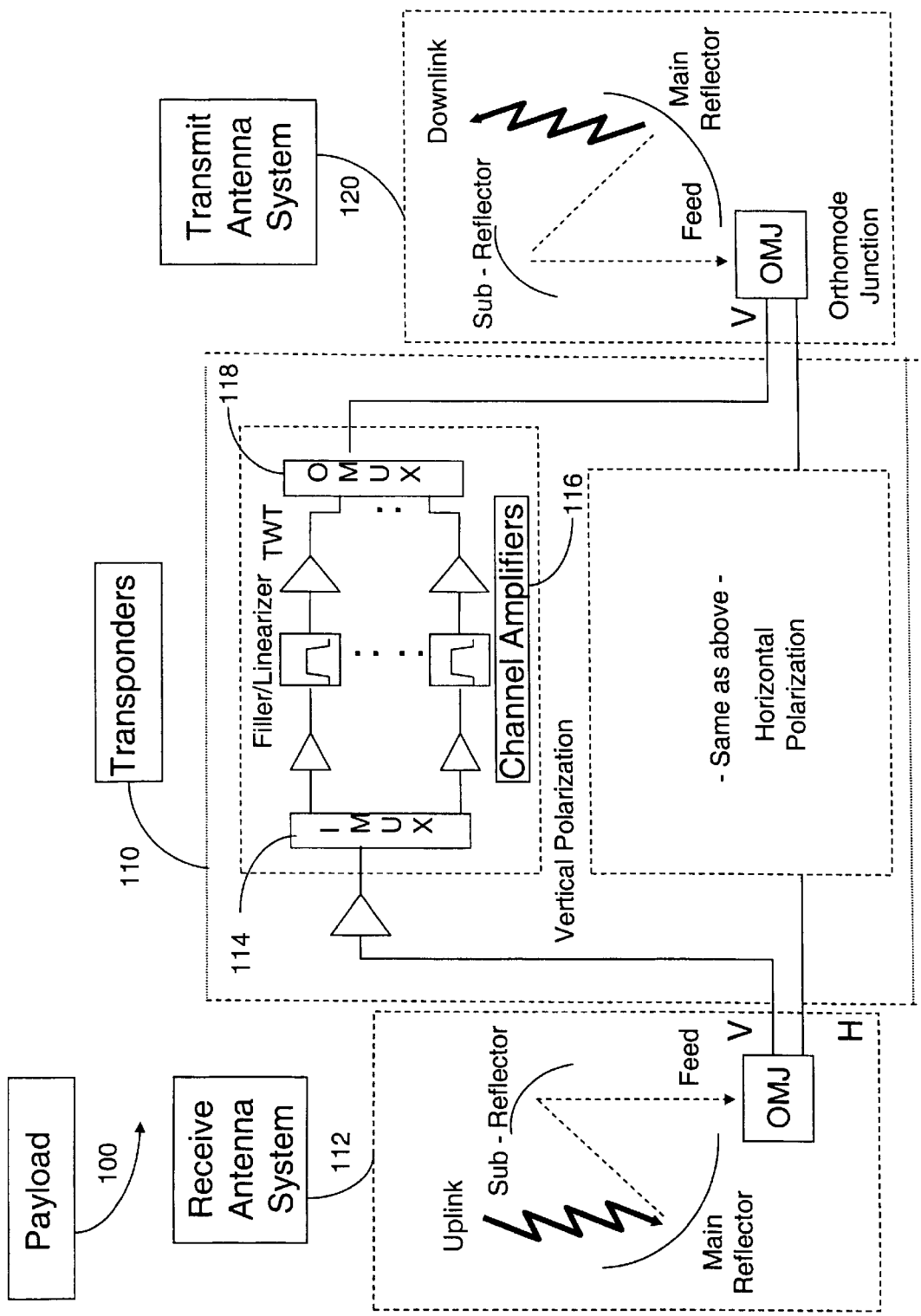
FIG. 3 is a schematic block diagram of a typical payload on a communications satellite illustrating channelized transponders.

Referring to FIG. 3, each of the communications satellites' payload 100 contains a major subsystem (payload 100) that can be organized by frequency bands, or transponders 110. The satellites utilized in an exemplary embodiment of the present invention are "bent-pipe" construction, with no on-board digital de-modulation. As illustrated in FIG. 3, the purpose of the "bent-pipe" payload is to receive the uplink signal through a dual-polarization receive antenna system 112, separate this signal into its two component polarizations, filter these signals into frequency channels through an input multiplexer 114, and then provide these signals into channelized amplifiers 116. After amplification, these channels are re-combined by an output multiplexer 118. The composite downlink channels are transmitted to earth by a dual-polarization transmit antenna system 120.

Figure 4:
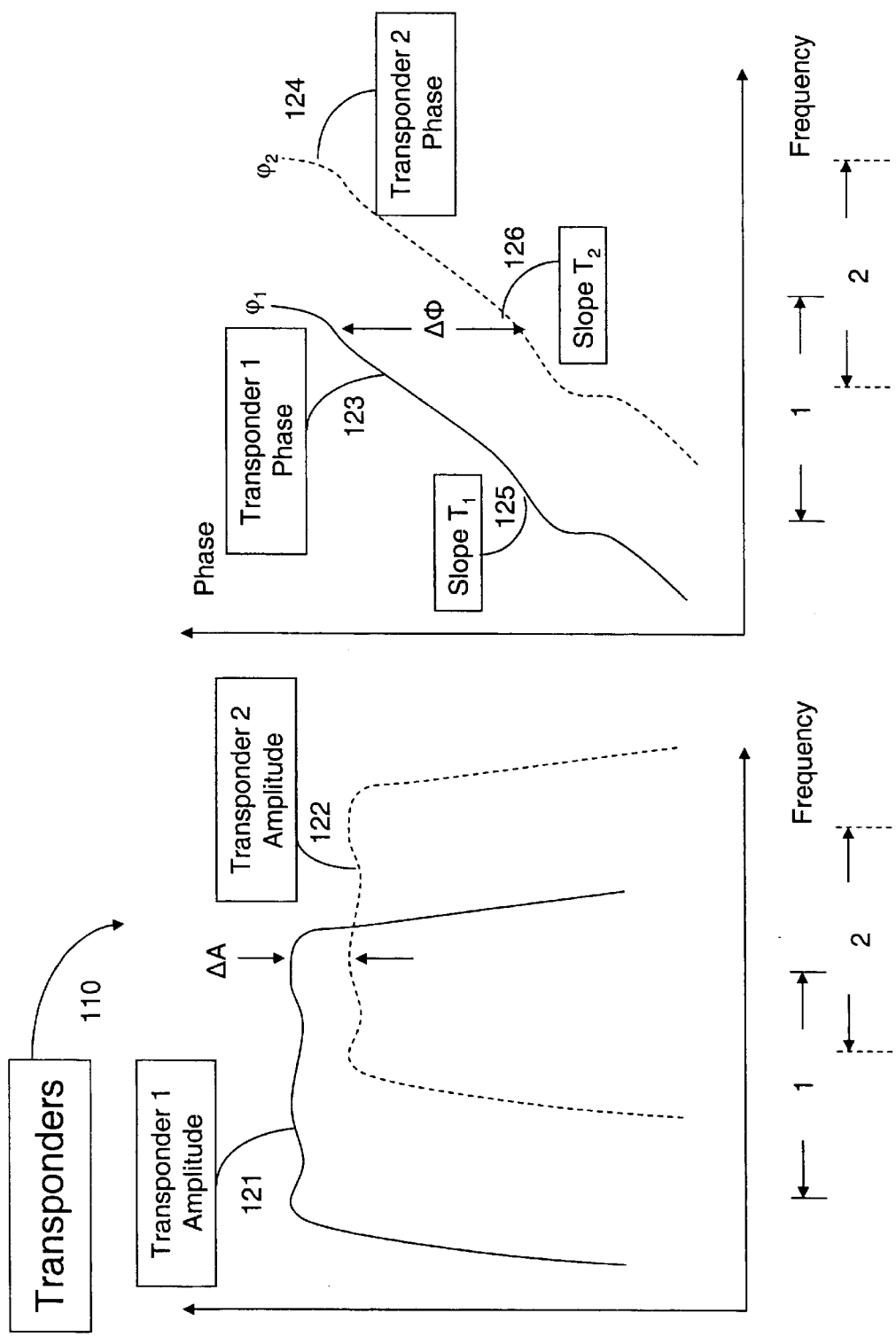
FIG. 4 is a diagram providing an illustration of a typical satellite transponder's phase and amplitude characteristics.

Although great care is taken in the design and construction of each transponder channel to create an amplitude response which is constant with frequency over the transponder bandwidth, and a phase response which is very linear with frequency over the transponder bandwidth, ordinarily the absolute values of these constants (ERP, group delay) are not required to match the corresponding transponder of opposite polarization. As shown in FIG. 4, the Transponder1 amplitude 121 may be offset relative to the Transponder2 amplitude 122. Likewise, the Transponder1 phase 123 may be offset relative o the Transponder2 phase 124. The phase slope 125 versus frequency of Transponder1 may also differ from the phase slope 126 of Trasponder2. Since these parameters do not introduce distortion into the transponder waveform, ordinarily no attempt is made to match them on a transponder-by-transponder basis. For this exemplary embodiment of the present invention, however, the purpose is to correlate these two responses by introducing precise offsets in identical waveforms supplied to these two transponders and create a downlink waveform in which the two transponders radiate a signal which is identical in amplitude with a constant 90 degree phase separation across the overlap frequency range. In order that the 90 degree offset be constant with frequency, it may be necessary to introduce slope corrections into the phase response of the transponder response curve. The polarization monitoring terminals allows an end-to-end system measurement to be made of these parameters in almost real time.

Figure 5:
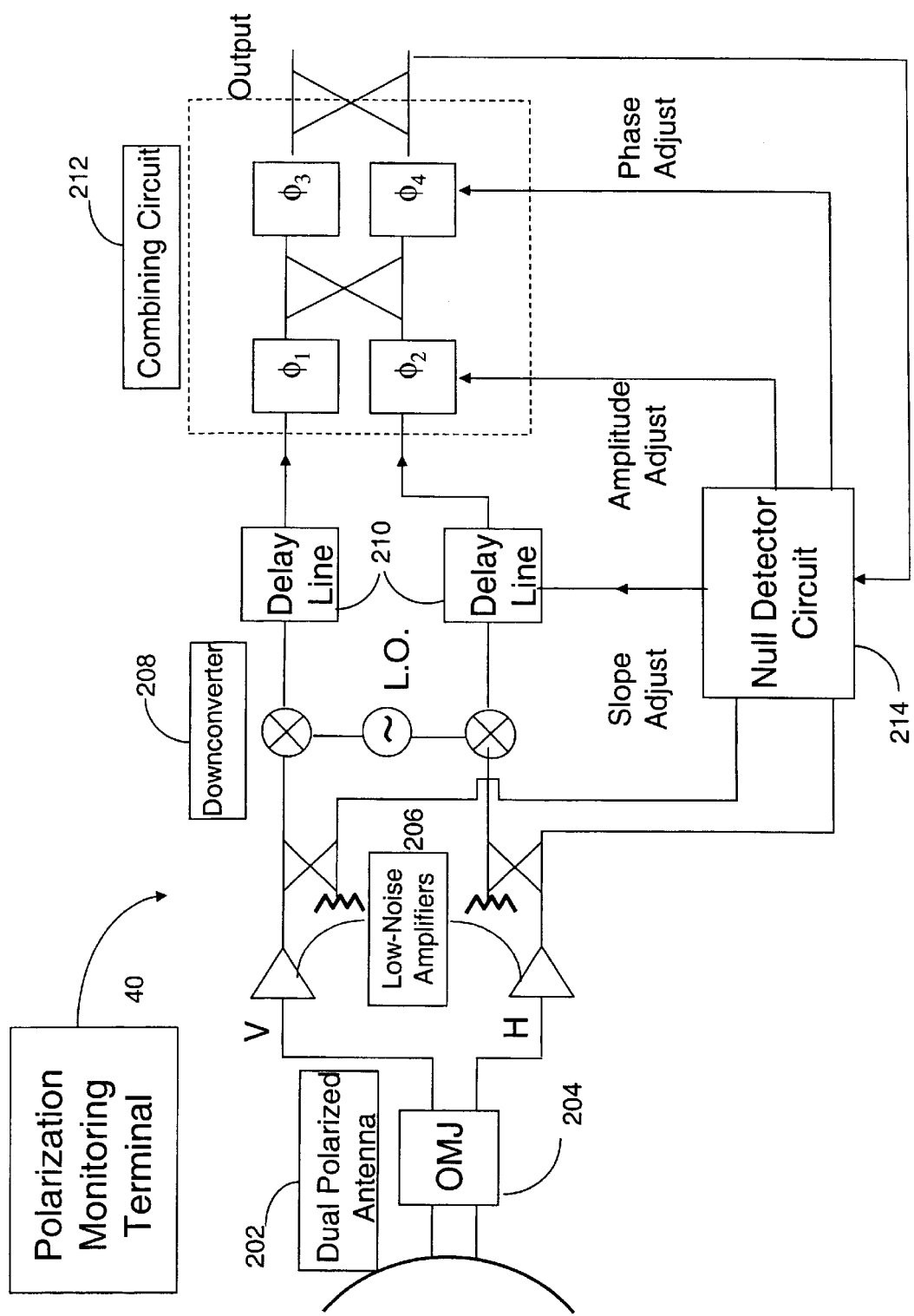
FIG. 5 is a diagram illustrating an exemplary circuit that can be used to accurately measure the polarization of the incident wave at the uplink or remote coverage area monitoring sites.

In order to determine the proper corrections, receiving terminals are installed at the uplink facility and at remote locations to accurately determine the polarization of the downlink waveform. A schematic for an exemplary polarization monitoring terminal 40 is shown in FIG. 5. The exemplary receiving terminal employs a dual polarized antenna 202 followed by an orthomode junction 204 to separate the two component polarizations. These components can be based on linear or circular basis component polarizations. These signals are amplified in low-noise-amplifiers 206, processed in a downconverter 208. A variable delay line 210 is adjusted to provide the best performance over the desired frequency band. A combining circuit 212 is adjusted to provide the minimum signal in a null detection circuit 214. This circuit can operate in a closed loop fashion and continuously adjust the differences in phase slope (delay), amplitude, and phase to accurately determine the received polarization.

Figure 6:
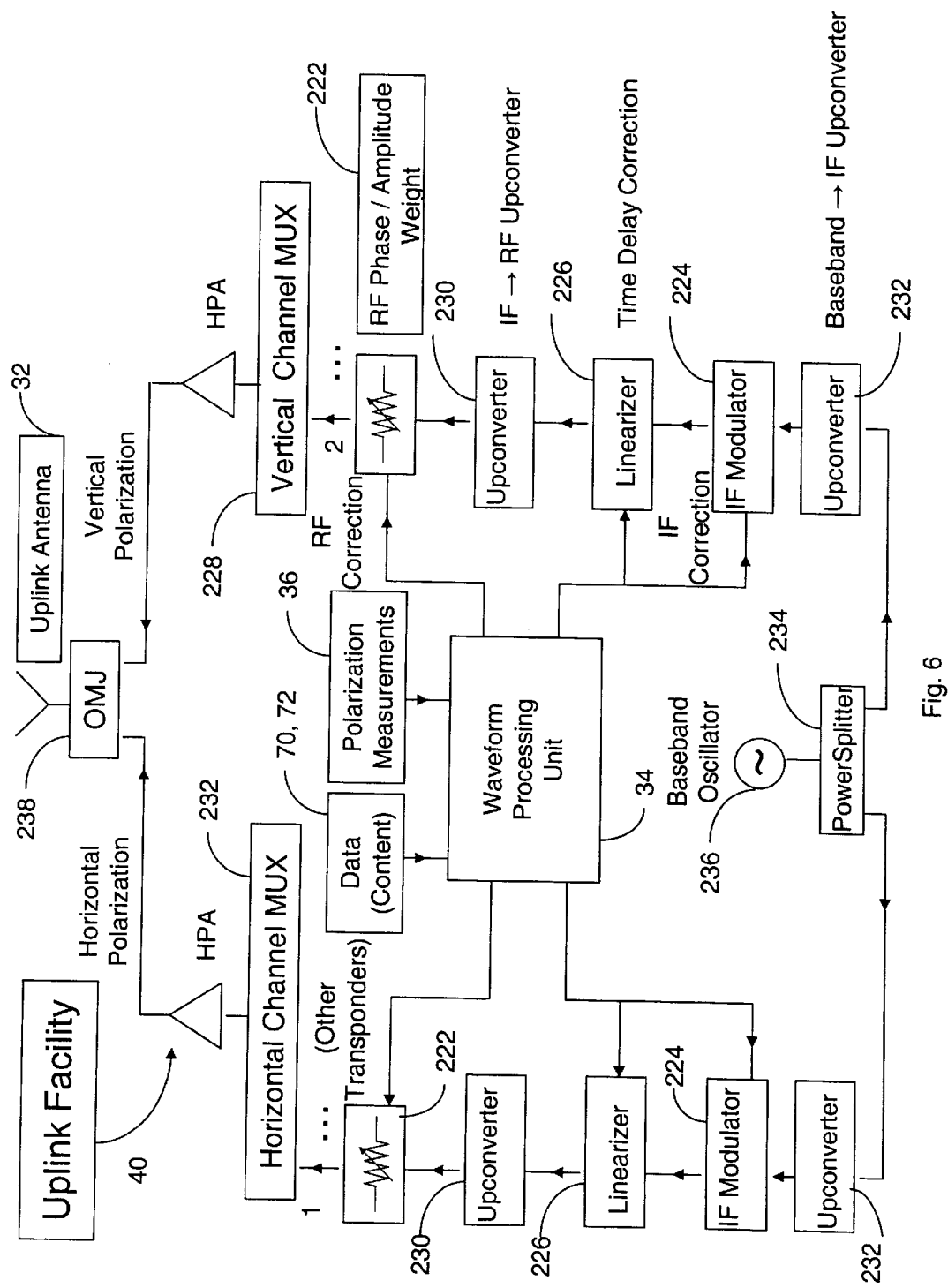
FIG. 6 is a diagram illustrating an exemplary uplink facility, illustrating the adjustments inserted into each transponder channel to provide for the desired uplink radiated waveform.

The three polarization parameters thus determined (amplitude offset, phase offset, slope offset) are then delivered to an exemplary uplink facility 40 for processing by the waveform processing unit 34, as shown in FIG. 6.

Using the polarization measurements 36 from the monitoring terminals, the waveform processing unit calculates the polarization corrections required to create the optimum relative values between the vertical and horizontal components for circular polarization (zero amplitude offset, 90-degree phase offset, zero slope offset). These polarizations corrections, otherwise known as adjustment factors, will create a precise 90-degree phase shift between the linear polarization components of the broadcast signal.

To generate these signals, a baseband oscillator 236 generates a waveform in the 70 MHz frequency range based on precision timing references. The baseband signal is split into two identical components by a power splitter 234, and is then processed by a baseband-to-IF upconverter 232. The waveform processing unit 34 commands the linearizer 226 to provide the optimum time delay correction to equalize the phase slope of the horizontal and vertical channel transponders. After adjusting the time delay linearizer, the waveform processing unit 34 next calculates the optimum phase offset to be inserted between these channels. This phase correction is then added to the phase state of the data 70 (or content 72), and inserted onto the carrier by either an IF modulator 224, or by an RF Phase/Amplitude Weight 222 (after upconversion by the IF→RF upconverter 230). Each vertical polarization channel thus processed is then multiplexed with other vertical transponders by the vertical channel MUX 228. In a similar manner, each horizontal channel is then multiplexed with other horizontal transponders by the horizontal channel MUX 240. The composite vertical and horizontal transponders are then combined by an orthomode junction (OMJ) 238 and transmitted by the uplink antenna 32.

From a downlink performance point of view, changes in the phase and amplitude relative to equal amplitude in the two polarizations and a 90-degree phase shift translate into a loss of received signal. To prevent excessive loss, the system should typically keep phases aligned within 6 degrees and amplitudes equal within 1 dB.

Figure 7:
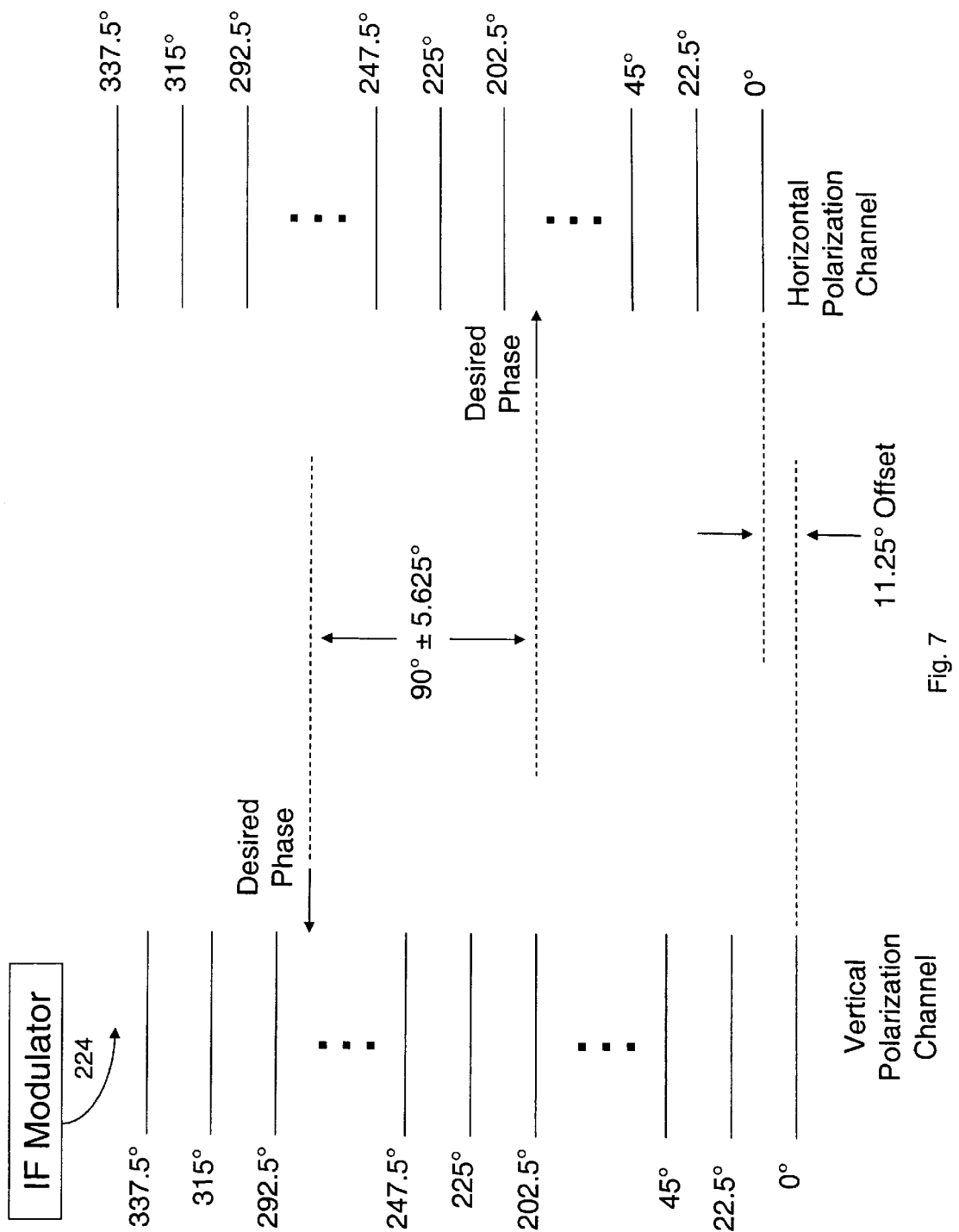
FIG. 7 is a diagram illustrating an exemplary method for inserting digital phase corrections into the content data stream by using a modified modulator command.

Corrections for antenna pattern characteristics can be determined based on a one-time measurement of variations in the channel response across CONUS. Based on these measurements, a one-time correction can be developed which can be applied to Internet data delivered on a packet-by-packet basis. Referring to FIG. 6 illustrating the exemplary uplink facility 30, it is seen that this can be also accomplished by varying the digital command to the IF modulator. This is a convenient point at which to introduce packet-by-packet phase corrections by using an exemplary digital IF modulator, as shown in FIG. 7. If a 256 QAM is used to provide 4 phase states and 4 amplitude states, the phase states would span a 360 degree range ~22.5 degrees apart. To achieve the optimum resolution in setting the precise 90-degree phase separation required for circular polarization, the phase states of the two polarizations are offset by 11.25 degrees (after slope equalization). The quantization error in the desired phase setting should then be no more than +−5.625 degrees. This degree of resolution is adequate for proper phase alignment as explained above.

Figure 8:
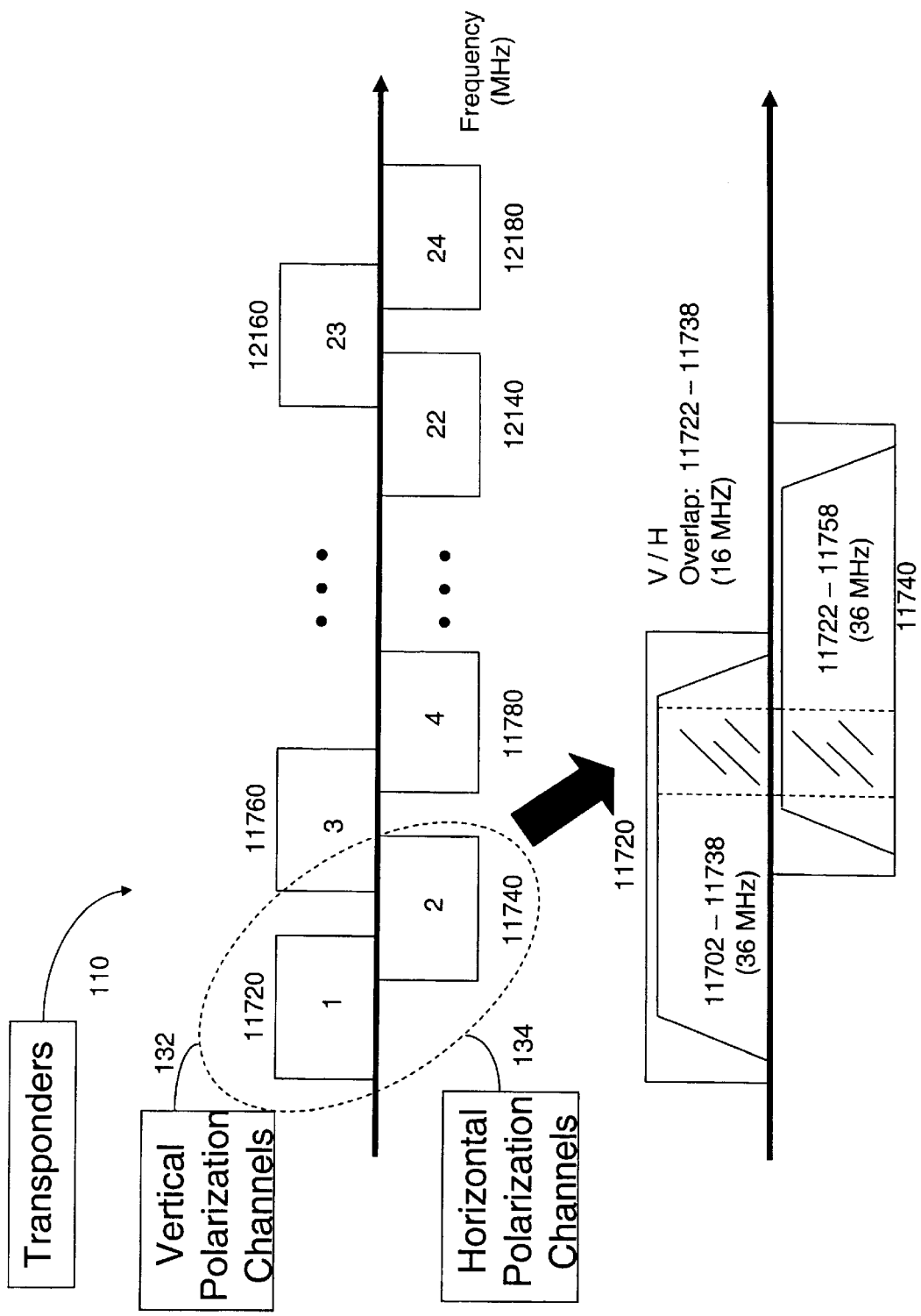
FIG. 8 is a block diagram illustrating transponder frequency assignments for an exemplary embodiment of the invention utilizing Ku FSS satellites over CONUS.

FIG. 8 shows typical transponder 110 frequency assignments for a modern CONUS Ku FSS satellite. Ordinarily, there is no correlation between the signals in the vertical polarization transponder channels 132 and the horizontal polarization channels 134. Referring to FIG. 8, vertical channel 1 is totally uncorrelated with horizontal channel 2. These are in fact often leased to different customers who merely provide "bits" to the uplink facility. The transponder center frequencies between the two polarizations are typically offset to provide maximum separation between the carriers of opposite polarization, overlapping frequency transponders. According to the teachings of an exemplary embodiment of the present invention, the overlapping frequency range of transponders 1 & 2 are excited from the uplink facility with suitable corrections to produce circular polarization with a new downlink carrier center frequency.

Figure 9:
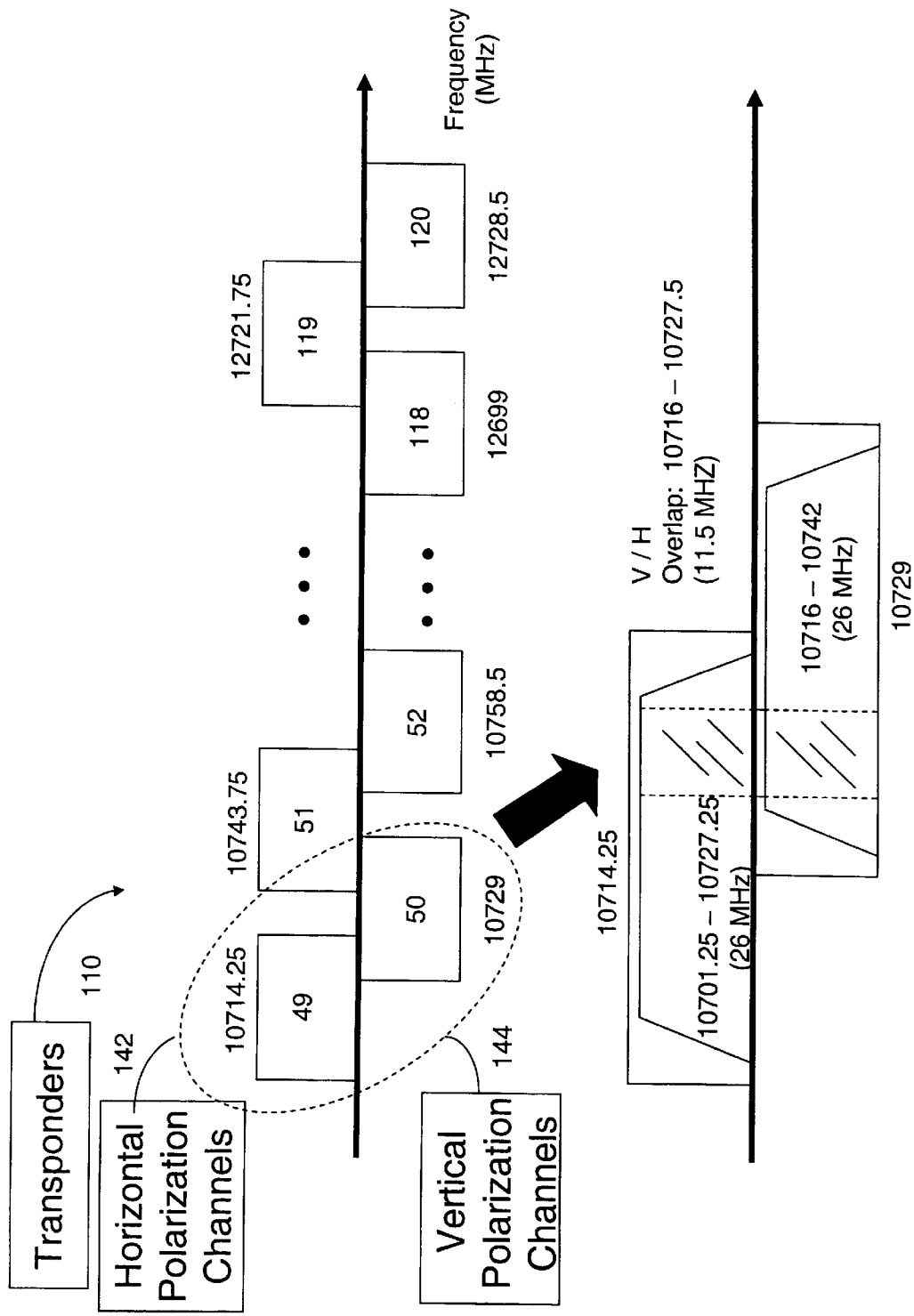
FIG. 9 is a block diagram illustrating transponder assignments for an exemplary embodiment of the invention using Ku BSS satellites over Europe.

FIG. 9 shows similar representative transponder 110 frequency channel assignment for a modern European Ku BSS satellite. The bandwidth of the horizontally polarized channels 142 and vertically polarized channels 144 is 26 MHz compared to 36 MHz for Ku FSS transponders. It should also be noted that the larger operating frequency range of 2 GHz for this service in Europe allows 120 transponder allocations rather than the 32, which is conventional in the CONUS DTH service.

Figure 10:
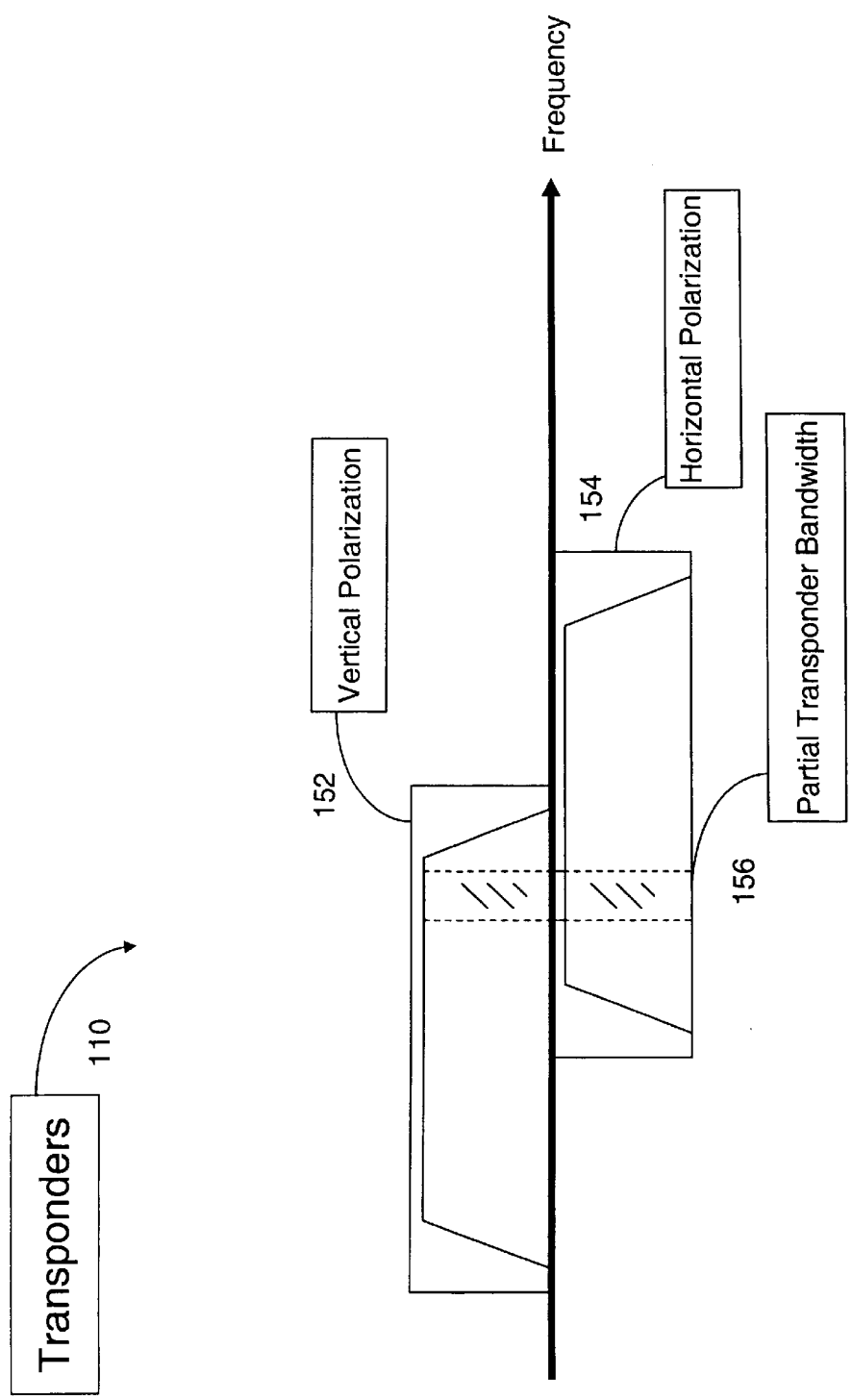
FIG. 10 is a diagram illustrating an exemplary application of digital phase corrections to two oppositely polarized transponders operating in a partial band operation ("SCPC" mode).

FIG. 10 shows a partial transponder bandwidth 156 in oppositely polarized exemplary transponders 152 & 154 that overlap in frequency. This mode of operation is similar to that described in connection with FIGS. 8 and 9 except that a smaller bandwidth (typically ~2–3 MHz) are utilized in this so-called "single channel per transponder" (SCPC) mode. It will be clear to those skilled in the art that the teachings of the various exemplary embodiments of the present invention apply equally well to this mode of operation.

For a mobile service, it is extremely desirable to have all mobile terminals operating with large elevation angles to minimize blockage and rain effects. Referring in FIG. 11, this leads to two exemplary methods for locating the communications satellite 20 for a CONUS service: (1) centrally located satellites 202 near ~95 degrees W orbital location from which most of CONUS can be covered with elevation angles greater than 35 degrees (2) "East/West" satellites 203 & 201 which can cover most of CONUS with elevation angles greater than 40 degrees. Case (1) will typically represent the preferred configuration for CONUS aeronautical services and case (2) will represent the preferred configuration for land mobile and marine services. In the event case (2) is selected for the service, location coordinates of the user terminals will be used to "hand-off" between East and West transponders. Although the geographical area being discussed in this embodiment is CONUS, it is clear that for any desired coverage the above location strategy may be followed, or additional refinements such as using the centrally located satellite 202 as a spare ("back-up") location for the East and West coast satellites 201 & 203. The advantage of the spare location being a "central" one is that a single satellite may be used to provide a back up for both the Eastern and Western slots simultaneously. It is clear that a second satellite in the same orbital location can provide redundancy or a doubling of capacity by transmitting the orthogonal circular polarization as recited below.

Figure 11:
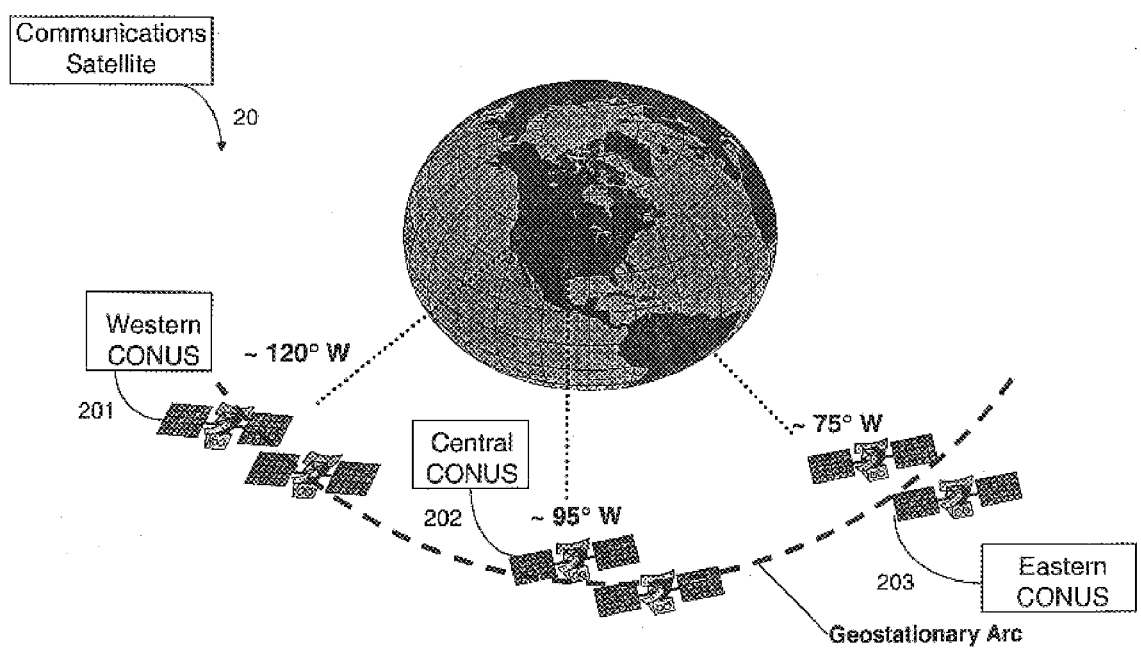
FIG. 11 is a diagram illustrating representative geostationary orbital slots over CONUS that may be used for an exemplary embodiment of the present invention, including the use of a second satellite for redundancy or increased capacity.

Referring to FIG. 11, an exemplary embodiment of the present invention will be described which provides mobile video broadcast channels across CONUS. In this embodiment, the transponders are located on satellites within the Eastern CONUS arc (~75 degrees W). The intended broadcast service to be provided is targeted at land mobile and marine users primarily along the Eastern coast of CONUS. This particular orbital location provides elevation angles >45 degree over roughly ⅓ of CONUS (up to Washington D.C.), and elevation angles >40 degrees over almost half-CONUS (up to Boston).

The service will be implemented on Ku FSS satellites having ERP ~50 dBW over most of CONUS (saturated TWT power levels ~120 W), with a transponder frequency plan shown in FIG. 8. The transponder analog 30 bandwidth is 36 MHz, and there is 16 MHz bandwidth available in the overlap of the oppositely polarized transponders (1&2 in FIG. 8, for example).

In the case of consumer automotive applications, market studies have shown that a typical consumer will accept the notion of a roof-mounted antenna, provided it is roughly the size and height of a sunroof (~18" diameter, ~3" high). In an aeronautical application, the corresponding form factor for a "streamlined" fuselage mounted corporate jet is almost identical. The technical challenge, and the one addressed by this invention, is to provide a communication system using existing Ku FSS satellites that will provide mobile high-speed data suitable for multiple video channels using such an antenna (which typically has 6 dB less gain than a standard DTH fixed antenna). The antenna must additionally be nearly flat in the roof of the vehicle, so an additional means of steering must be accommodated to address this requirement. In the case of the land mobile platforms, blockage from man-made objects such as buildings and foliage are the predominant causes of signal fading. Both of these problems favor large elevation angles for satellite pointing (>35 degrees for adequate performance, with >40 degrees preferred).

The satellite communication link must be designed so that it provides adequate margin to address all the issues affecting signal availability. This requires maximizing the received power while simultaneously minimizing the noise. A combination of the following three techniques are employed in the present invention to provide improved high-speed communications using small, mobile antennas:

(1) The ERP of the satellite will be effectively doubled by exciting two transponders of opposite linear polarization, but overlapping frequency range, with the same downlink waveform (as modified for optional circular polarization.

(2) The bandwidth of the overlapping transponder downlink signal will be typically cut in half compared to the full transponder bandwidth, thereby reducing the thermal noise in the receiver by ~3 dB.

(3) A spread spectrum waveform can be overlaid on the downlink QPSK signal, providing additional processing gain at the expense of reduced data throughput.

The use of the two approaches above will provide an improved signal-to-noise ratio of 6–9 dB. In addition, a spread spectrum waveform with a code length of 2–16 can provide 3–12 dB of additional processing gain if required by the minimum link margin (at the expense of reduced throughput).

The techniques discussed above can also be employed within a Ku BSS satellite transponder operating within Europe (governed by ITU regulations, rather than FCC). In this case the transponders broadcast in linear polarization. The broader European BSS frequency band (2 GHz) means that 120 (25 MHz) transponder slots are available in each orbital slot for rather than the 32 (24 MHz) transponder slots available in each orbital slot over CONUS. Since BSS satellites already operate close to the power flux density limit, the present invention provides a unique method for enabling much smaller antennas to operate in this region.

In view of the foregoing requirements, the communications service is preferably provided to vehicular platforms that intend to receive the satellite signal with a roof-mounted antenna no greater than 18" in diameter and 3.5" high. For this application, a one-dimensional electronically steered (in elevation) tracking antenna shown described earlier is a preferred exemplary embodiment of the tracking antenna solution. Based an aperture height of 3" and a width of 18", the antenna protrusion above the mounting surface should be only ~2.8" when the antenna is mounted with a 30 degree mechanical offset to the mounting surface.

The antenna aperture can be physically realized in a number of implementations (traveling waved feeds, wide horns . . . ) that provide for a nearly uniform aperture illumination. The maximum electronic scan angle to be provided by the antenna will be only ~25 degrees, allowing operation up to 40 degree elevation angles (north of Boston) with a 5 degree allowance for grade slope while driving. The antenna will be designed to provide a minimum electronic scan angle of 30 degrees over all conditions. The 3" elevation direction antenna aperture means that the elevation beam width will be on the order of 20 degrees. With this large beamwidth, tracking considerations are considerably simplified for the elevation tracking compared to he mechanical tracking accuracy required for the azimuth direction (beam width ~3.5 degrees).

Given the physical size of the antenna and its limited elevation scanning requirement, the effective gain of the aperture is expected to be reduced by <1.5 dB due to the scanning, with another ~1 dB allowance for the radome losses. From earlier discussions, the present invention will maintain the circular polarization purity to a level whereby <0.5 dB losses will be incurred due to polarization effects. The above implementation provides a link margin of ~3 dB when used with QPSK modulation and "turbo-coded" forward error correction, versus a ~8 dB margin for conventional DTH service in CONUS. Increasing the aperture height to 6" while maintaining a 30 degree maximum elevation scan requirement will increase the link margin to 6.6 dB with a height below 4".

In another exemplary embodiment of the present invention, the satellites utilized employ Ku BSS transponders, and are located above Europe (19 or 29 degrees East orbital location). FIG. 9 shows the transponder frequency channel assignment for a modern European Ku BSS satellite. The bandwidth of the horizontally polarized channels and vertically polarized channels is 26 MHz compared to 36 MHz for Ku FSS transponders.

The mobile tracking antenna will be assumed to be a two-dimensional electronically scanned antenna. An antenna aperture of only 9" diameter would contain ~100 single polarized elements, which would provide an area gain ~6 dB below a standard 18" dish. Allowing for an active array with amplifiers on every element (+3 dB GfT improvement), 4–5 dB of scan loss when scanning to 60 degrees off boresight, and a 1 dB radome loss, the link margin would be ~3 dB worse than a conventional DTH dish.

To achieve the same link margin as the conventional DTH system, a spreading code can be added to the downlink waveform. To achieve the required ~3 dB improvement in link margin, the throughput of each transponder pair will be reduced by a factor of ~2. However, the cost of the overall system (satellite plus terminals) could be significantly lowered because of the inexpensive tracking terminal. The all-electronic implementation (with no moving parts) is also a very attractive feature.

In still another exemplary embodiment the satellite is located over the Atlantic Ocean at ~50 degrees West, and is designed to provide service to aeronautical platforms with low profile antennas. In this case a 2D mechanically steered antenna system described is the preferred solution because of the large elevation scan angle (up to 90 degrees). Assuming that a uniformly illuminated aperture with a width of 18" and a height of 3" is used, the effective antenna gain compared to a standard 36" diameter dish is ~11.3 dB lower. The combination of two transponders with 16 MHz bandwidth creates an improved signal to noise ratio of +6.5 dB, reducing the link margin by 4.8 dB compared to conventional Ku FSS. Assuming that the transponder ERP could be as low as 48 dBW, the link margin deficit would be in the 4.8–6.8 dB range. In this case, a coding gain of 6 dB (4× throughput reduction) would be sufficient to restore nominal link margins.

In view of the foregoing, it will be appreciated that the present invention comprises a satellite-based communications network having a communications satellite and multiple mobile user terminals operating within a coverage area of the communications satellite. The communications satellite typically includes at least a pair of transponders having overlapping frequency ranges and operative to transmit a downlink signal with certain polarization components for reception at ground level by one or more of the mobile user terminals. The downlink signal typically comprises video and audio content or Internet data. Multiple remote monitoring terminals are positioned at locations within the coverage area of the communications satellite. Each monitoring terminal is operative to monitor the polarization components of the downlink signal as received by the monitoring terminal and to output measured polarization data to an uplink transmitting facility. This uplink transmitting facility can transmit an uplink signal for reception by the transponders of the communications satellite. The uplink transmitting facility is responsive to the measured polarization data output by the monitoring terminals to control the relative phase and amplitude of the uplink signal. The transponders of the communications satellite can respond to the relative phase and amplitude of the uplink signal to adjust the characteristics of the downlink signal. This adjustment enables the satellite to maintain at least a predetermined threshold of quality in the polarization components for the downlink signal as received by the mobile user terminals.

The network can also include a content aggregation network operative to accept the video and audio content from numerous sources and to deliver the video and audio content to the uplink transmitting facility. In turn, the uplink transmitting facility can transmit the uplink signal with the video and audio content for subsequent broadcast by the communications satellite in accordance with a programming schedule.

The network can also include a return link between at least one of the mobile user terminals and the uplink transmitting facility to communicate user content requests and location data from the mobile user terminal to the uplink transmitting facility.

The network can also include a network operations center operative to generate aggregated broadcast content by aggregating and formatting broadcast content for delivery to the uplink transmitting facility. In turn, the uplink transmitting facility can transmit the uplink signal with the aggregated broadcast content for subsequent broadcast by the communications satellite within the coverage area of the communications satellite.

The downlink signal output by the transponders of the communications satellite can comprise a spread spectrum code to support a reduction in the size of each tracking antenna required for reception of the downlink signal by the mobile user terminals and to reduce adjacent satellite interference in the reception of the downlink signal by the mobile user terminals.

While these exemplary embodiments for carrying out the invention have been described in detail, those familiar with the art to which this invention relates will recognize various alternative designs and embodiments for practicing the invention as defined by the following claims.

What is claimed is:

1. A satellite-based communications network, comprising
   a plurality of mobile user terminals with integrated tracking antennas;
   a communications satellite comprising at least a pair of transponders having overlapping frequency ranges and operative to transmit a downlink signal having certain polarization components and comprising video and audio content for reception by the mobile user terminals operating within a coverage area of the communications satellite;
   a plurality of remote monitoring terminals positioned at locations within the coverage area of the communications satellite, each monitoring terminal operative to monitor the polarization components of the downlink signal as received by the monitoring terminal and to output measured polarization data in response to monitoring of the downlink signal; and
   an uplink transmitting facility for transmitting an uplink signal for reception by the transponders of the communications satellite, the uplink transmitting facility responsive to the measured polarization data output by the monitoring terminals to control the relative phase and amplitude of the uplink signal,
   whereby the transponders are responsive to the relative phase and amplitude of the uplink signal to maintain at least a predetermined threshold of quality in the polarization components for the downlink signal received by the mobile user terminals operating in at least a portion of the coverage area for the communications satellite.

2. The network recited by claim 1, further comprising a content aggregation network operative to accept the video and audio content from a plurality of sources and to deliver the video and audio content to the uplink transmitting facility, wherein the uplink signal transmitted by the uplink transmitting facility further comprises the video and audio content for subsequent broadcast by the communications satellite in accordance with a programming schedule.

3. The network recited by claim 1, further comprising a return link between at least one of the mobile user terminals and the uplink transmitting facility to communicate user content requests and location data from the mobile user terminal to the uplink transmitting facility.

4. The network recited by claim 1, further comprising a network operations center operative to generate aggregated broadcast content by aggregating and formatting broadcast content for delivery to the uplink transmitting facility, wherein the uplink signal transmitted by the uplink transmitting facility further comprises the aggregated broadcast content for subsequent broadcast by the communications satellite within the coverage area of the communications satellite.

5. The network recited by claim 1 wherein the downlink signal output by the transponders of the communications satellite further comprises a spread spectrum code to support a reduction in the size of each tracking antenna required for reception of the downlink signal by the mobile user terminals and to reduce adjacent satellite interference in the reception of the downlink signal by the mobile user terminals.

6. The network recited by claim 1 further comprising a second communications satellite positioned in the same orbital location as the communications satellite for reception by the mobile user terminals, the second communications satellite having at least one pair of transponders operative to output another downlink signal having polarization components orthogonal to the polarization components of the downlink signal output by the communications satellite, the other downlink signal comprising the video and audio content of the downlink signal output by the communications satellite.

7. The network recited by claim 1, wherein the polarization components comprise a pair of opposite linear polarizations and the transponders are responsive to the relative phase and amplitude of the uplink signal to produce the downlink signal having a new carrier center frequency within the overlap region of the overlapping frequency ranges and exhibiting circular polarization for reception at ground level by the mobile user terminals.

8. A satellite-based communications network, comprising
   a plurality of mobile user terminals with integrated tracking antennas;
   a communications satellite comprising at least a pair of transponders having overlapping frequency ranges and operative to communicate a downlink signal having certain polarization components and comprising Internet data for reception by the mobile user terminals operating within a coverage area of the communications satellite;
   a plurality of remote monitoring terminals positioned within the coverage area of the communications satellite, each monitoring terminal operative to monitor the polarization components of the downlink signal and to output measured polarization data in response to monitoring of the downlink signal;
   a plurality of remote monitoring terminals positioned at locations within the coverage area of the communications satellite, each monitoring terminal operative to monitor the polarization components of the downlink signal as received by the monitoring terminal and to output measured polarization data in response to monitoring of the downlink signal; and
   an uplink transmitting facility for transmitting an uplink signal for reception by the transponders of the communications satellite, the uplink transmitting facility responsive to the measured polarization data output by the monitoring terminals to adjust at least one correction factor for the uplink signal,
   whereby the transponders are responsive each correction factor of the uplink signal to maintain at least a predetermined threshold of quality in the polarization components of the downlink signal received by the mobile user terminals operating in at least a portion of the coverage area for the communications satellite.

9. The network recited by claim 8, further comprising a return link between at least one of the mobile user terminals and the uplink transmitting facility to communicate user data requests, location data and return link data from the mobile user terminal to the uplink transmitting facility.

10. The network recited by claim 8, further comprising a network operations center, coupled to the Internet, operative to store and sequence Internet data for intended delivery to the uplink transmitting facility, wherein the uplink signal transmitted by the uplink transmitting facility further comprises the Internet data for subsequent communication by the communications satellite within the coverage area of the communications satellite.

11. The network recited by claim 8 wherein the downlink signal output by the transponders of the communications satellite further comprises a spread spectrum code to support a reduction in the size of each tracking antenna required for reception of the downlink signal by the mobile user terminals and to reduce adjacent satellite interference in the reception of the downlink signal by the mobile user terminals.

12. The network recited by claim 8 further comprising a second communications satellite positioned in the same orbital location as the communications satellite for reception by the mobile user terminals, the second communications satellite having at least one pair of transponders operative to output another downlink signal having polarization components orthogonal to the polarization components of the downlink signal output by the communications satellite, the other downlink signal comprising the Internet data of the downlink signal output by the communications satellite.

13. The network recited by claim 8, wherein the polarization components comprise a pair of opposite linear polarizations and the transponders are responsive to the correction factors of the uplink signal to produce the downlink signal having a new carrier center frequency within the overlap region of the overlapping frequency ranges and exhibiting circular polarization for reception at ground level by the mobile user terminals.

14. A method for communicating a downlink signal via a communications satellite to a plurality of mobile user terminals operating within at least a portion of the coverage area for the communications satellite, the downlink signal having certain polarization parameters and comprising broadcast content, comprising the steps:

generating measured polarization data by measuring the polarization parameters of the downlink signal in response to monitoring the downlink signal at one or more ground locations within the coverage area of the communications satellite;

outputting the measured polarization data;

transmitting uplink signals for reception by the communications satellite, the uplink signals comprising adjustment factors for adjusting at least one of the polarization parameters of the downlink signal; and varying at least one of the adjustment factors for the uplink signals in response to receipt of the measured polarization data to maintain at least a predetermined threshold of quality for the polarization parameters of the downlink signal as received at ground level by the mobile user terminals.

15. A method for communicating a downlink signal output via a communications satellite to a plurality of mobile user terminals operating within at least a portion of the coverage area for the communications satellite, the downlink signal having certain polarization parameters and comprising broadcast content, comprising the steps:

transmitting uplink signals for reception by the communications satellite, the uplink signals comprising adjustment factors for adjusting the polarization parameters of the downlink signal; and varying at least one of the adjustment factors for the uplink signals based on measured polarization data to maintain at least a predetermined threshold of quality for the polarization parameters of the downlink signal as received at ground level by the mobile user terminals, the measured polarization data comprising measurements of the polarization parameters of the downlink signal, the measurements collected at one or more ground locations within the coverage area of the communications satellite.

\* \* \* \* \*